United States Patent [19]

Tanaka et al.

[11] 4,344,096
[45] Aug. 10, 1982

[54] CASSETTE TAPE RECORDER

[75] Inventors: Shinsaku Tanaka, Tokyo; Kunio Kido, Wako, both of Japan

[73] Assignee: Tanashin Denki Co., Ltd., Tokyo, Japan

[21] Appl. No.: 119,371

[22] Filed: Feb. 7, 1980

[30] Foreign Application Priority Data

Nov. 9, 1979 [JP] Japan ................................ 54/145116

[51] Int. Cl.³ ........................ G11B 15/66; G11B 5/54
[52] U.S. Cl. .................................. 360/96.5; 360/93; 360/105
[58] Field of Search ................ 360/96.5, 96.6, 96.1, 360/93, 105; 242/198–200

[56] References Cited

U.S. PATENT DOCUMENTS

| | | | |
|---|---|---|---|
| 2,941,914 | 9/1960 | Dubois | 360/96.4 |
| 3,608,908 | 9/1971 | Yamamoto et al. | 360/96.5 |
| 3,949,423 | 4/1976 | Katada et al. | 360/96.5 |
| 3,976,262 | 8/1976 | Kennedy | 360/96.5 |
| 4,044,391 | 8/1977 | Takahashi | 360/96.5 |
| 4,065,800 | 12/1977 | Wilson et al. | 360/96.5 |
| 4,071,860 | 1/1978 | Wantanabe et al. | 360/96.5 |
| 4,134,142 | 1/1979 | Ohashi | 360/93 |
| 4,163,997 | 8/1979 | Sugihara | 360/96.5 |
| 4,202,021 | 5/1980 | Nagase et al. | 360/96.5 |

FOREIGN PATENT DOCUMENTS 55-12520   1/1980   Japan ................................ 360/96.5

Primary Examiner—Alfred H. Eddleman
Attorney, Agent, or Firm—Schwartz, Jeffery, Schwaab, Mack, Blumenthal & Koch

[57] ABSTRACT

With a cassette tape recorder embodying this invention, a cassette-holding board provided with at least one reel shaft and at least one capstan shaft is fitted to a fixed case in a state capable of sliding into and out of said fixed case. A magnetic head, pinch roller and motor are movably mounted on the cassette-holding board in the fixed case. A cassette-pressing plate spring is fitted to the inner wall of both lateral boards of the fixed case. Where the cassette-holding board is made to slide out of the fixed case, a tape cassette is inserted into the cassette-loading section of the cassette-holding board and then the cassette-holding board is made to slide into the fixed case, then the tape cassette is pressed by the cassette-pressing plate spring, bringing the magnetic head and pinch roller into contact with a magnetic tape received in the tape cassette. Where the cassette-holding board is made to slide out of the fixed case, then the magnetic head and pinch roller are removed from the cassette-holding board, and the cassette-pressing plate spring is also released from the tape cassette, thereby enabling the tape cassette to be easily taken out of the cassette-loading section on the outside of the fixed case.

4 Claims, 7 Drawing Figures

CASSETTE TAPE RECORDER

BACKGROUND OF THE INVENTION

This invention relates to a cassette tape recorder, wherein a cassette holder can be freely taken into and out of a fixed case.

The conventional widely accepted cassette tape recorder to be used with, for example, a car stereophonic system is the type in which a movable board fitted with at least one reel shaft and at least one capstan shaft is set below a tape cassette-loading section. When the tape cassette is put into the tape cassette-loading section substantially in a horizontal direction, the movable board is lifted by the insertion of the tape cassette, thereby causing the reel shaft and capstan shaft to be inserted into the opening of the tape cassette from below.

However the known cassette tape recorder arranged as described above has drawbacks. Since the reel shaft and capstan shaft are moved into and out of the tape cassette by vertically shifting the movable board, it is impossible to decrease the extent to which the movable board must be vertically shifted. Accordingly, the cassette tape recorder has an appreciably great thickness, which renders the cassette tape recorder undesirable for use with a car stereophonic system.

SUMMARY OF THE INVENTION

It is accordingly the object of this invention to provide a cassette tape recorder which is made sufficiently thin to be widely used with a car stereophonic system.

To this end, the present invention provides a cassette tape recorder which comprises:

a fixed substrate;

a cassette-holding board which is provided with a cassette-loading section for detachably holding a cassette and also with at least one reel shaft and at least one capstan shaft, and is further designed to be freely moved into and out of the fixed case; and a magnetic head and pinch roller, which contact a magnetic tape received in the cassette, when the cassette-holding board is pushed into the fixed case, and are removed from the cassette when the cassette-holding board is pulled out of the fixed case.

DETAILED DESCRIPTION OF THE INVENTION

Figure 1:
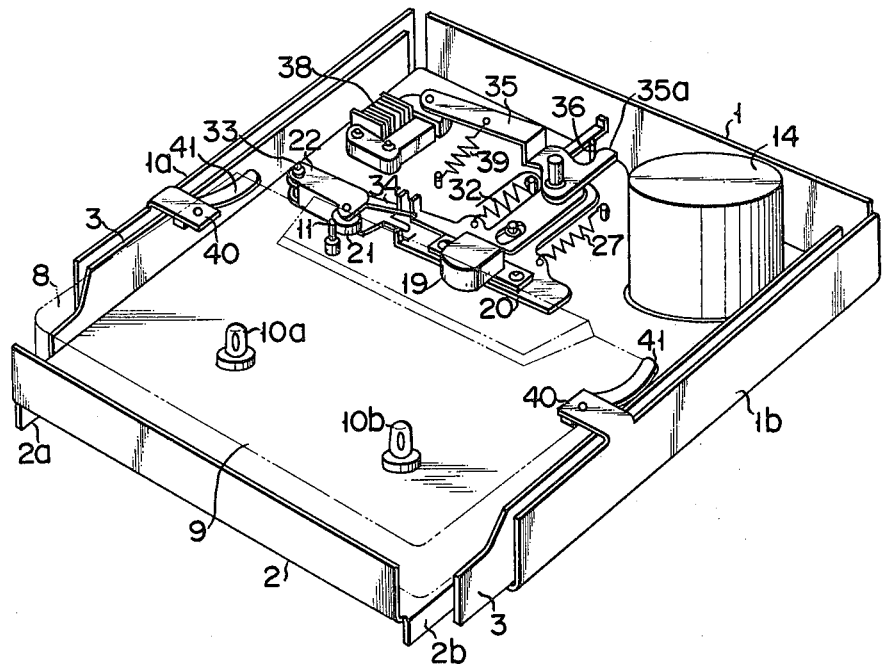
FIG. 1 is an oblique view of the interior of a cassette tape recorder embodying this invention.
Figure 2:
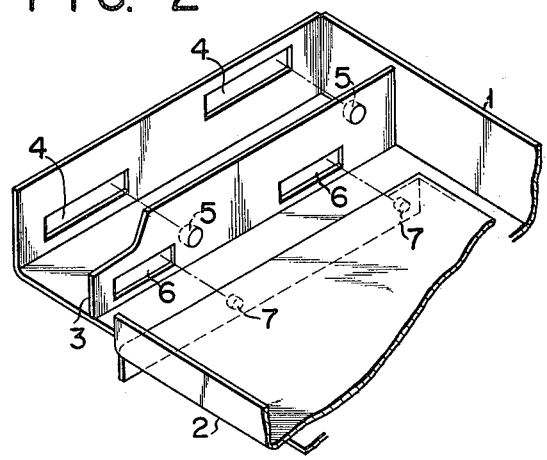
FIGS. 2 and 3 are exploded oblique views showing the relative positions of the fixed case, cassette-holding board and slide board when they are set in place.
Figure 3:
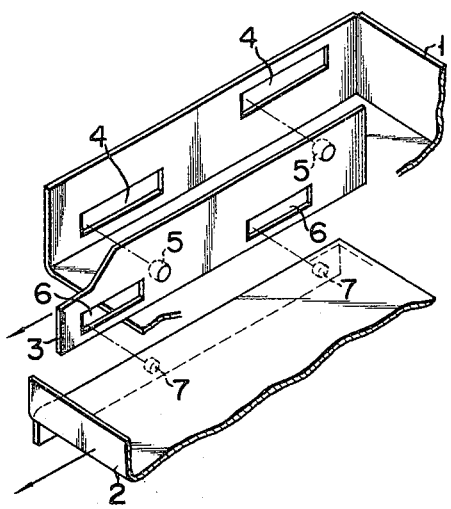

FIG. 1 schematically shows an arrangement of a cassette tape recorder embodying this invention. Reference numeral 1 denotes a fixed case, and reference numeral 2 shows a cassette-holding board. The cassette-holding board 2 is mounted on the base board of the fixed case 1. A slide board 3 is inserted between the left side lateral wall 1a of the fixed case 1 and the left side lateral wall 2a of the cassette-holding board. A slide board 3 is also provided between the right side lateral wall 1a of the fixed case 1 and the right side lateral wall 2a of the cassette-holding board 2. As seen from FIGS. 2 and 3, a pair of guide holes 4 are formed in the left and right side lateral walls 1a, 1b (only the left side lateral wall 1a indicated) of the fixed case 1. The slide board 3 is provided with guide pins 5 which are engageable with the paired guide holes 4, and which consequently can slide back and forth relative to the fixed case 1. The slide board 3 itself is provided with a pair of guide holes 6. The left and right side lateral walls 2a, 2b of the cassette-holding board 2 are respectively provided with a pair of guide pins 7 engageable with the paired guide holes 6. Therefore, the cassette-holding board 2 can freely slide back and forth relative to the slide board 3. As a result, a maximum extent to which the cassette-holding board 2 can slide relative to the fixed case 1 is equal to a scan of a maximum slide extent of the slide board 3 relative to the fixed case 1 and a maximum slide extent of the cassette-holding board 2 relative to the slide board 3. Consequently the cassette-holding board 2 can slide for a great distance relative to the fixed case 1 from the position of FIG. 4 to that of FIG. 5.

Figure 4:
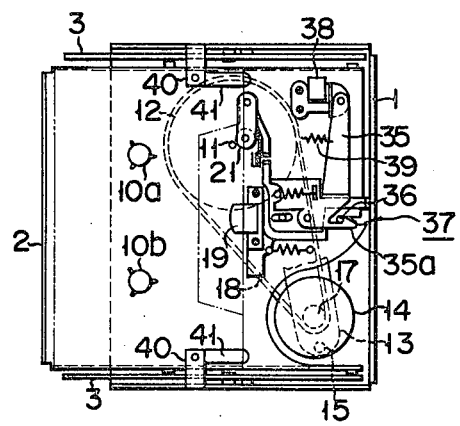
FIGS. 4 and 5 are plan views of a cassette tape recorder when moved into and out of the fixed case.
Figure 5:
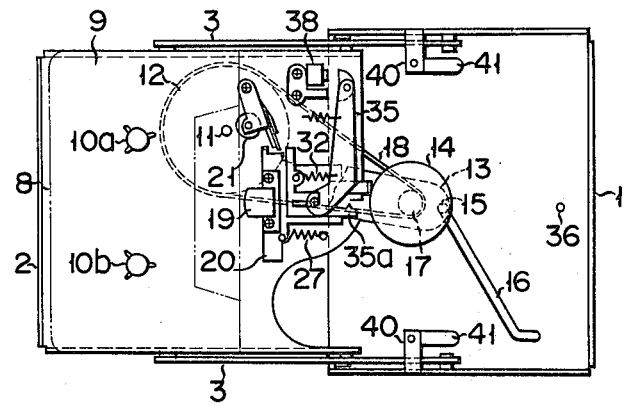

A cassette-loading section 9 (FIG. 1) allowing for the loading of a tape cassette 8 is provided on that portion of the upper surface of the cassette-holding board 2 which faces the open side of the fixed case 1. The cassette-loading section 9 is fitted with a pair of left an right reel shafts 10a, 10b and a capstan shaft 11. A flywheel 12 (FIG. 4) is fitted to the capstan shaft 11 on the underside of the cassette-holding board 2. A motor-fitting board 13 is rotatably mounted on the underside of the cassette-holding board 2. A motor 14 is fitted to the upper surface of the rotatable end portion of the motor-fitting board 13. A cam pin 15 is projectively provided on the underside of the rotatable end portion of the motor-fitting board 13. A cam hole 16 through which the cam pin 15 slides is formed in the base board of the fixed case 1. The cam hole 16 is inclined at an angle of about 60° to the direction in which the cassette-holding board 2 slides. Where, as shown in FIG. 4, the cassette-holding board 2 slides most inward relative to the fixed case 1, then the cam pin 15 is positioned at the right side end of the cam hole 16, and the motor 14 lies near the cassette-loading section 9. Where, however, the cassette-holding board 2 slides outward, then the cam pin 15 slides through the cam hole 16 to the left side. As a result, the rotatable end of the motor-fitting board 13 is rotated toward the longitudinal center line of the fixed case 1, causing the motor 14 to be removed from the cassette-loading section 9. Where the cassette-holding board 2 slides most outward as shown in FIG. 5, then the cassette-loading section 9 protrudes from the fixed case 1. However, the motor 14 is retained within the fixed case 1. Where the cassette-holding board 2 slides to the position of FIG. 4, then the motor 14 is connected to a power source. The rotary shaft of the motor 14 protrudes from the underside of the motor-fitting board 13. The protruding end of the rotary shaft is fitted with a motor pulley 17. This motor pulley 17 and flywheel 12 are jointly rotated by means of an endless belt 18. The flywheel 12 and a takeup reel shaft 10a are also jointly rotated by means of a transmission mechanism (not shown).

Figure 6:
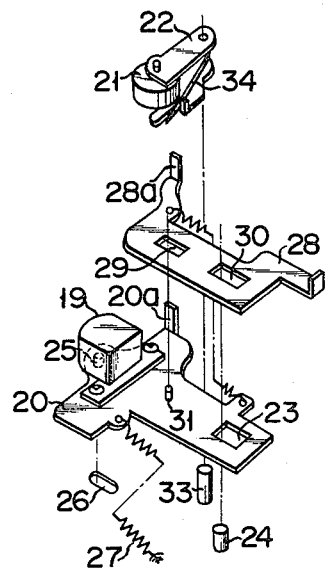
FIG. 6 is an exploded oblique view showing the relative positions of the magnetic head and pinch roller when they are set in place.
Figure 7:
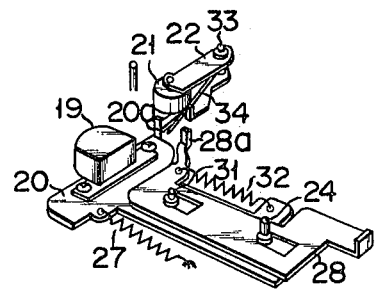
FIG. 7 is an oblique view of the magnetic head and pinch roller when they are assembled.

A slide board 20 fitted with a magnetic head 19 is mounted on the upper surface of the cassette-holding board 2, so as to slide back and forth relative to said cassette-holding board 2. A pinch arm 22 pivotally supported by a pinch roller 21 is rotatably mounted on the upper surface of the cassette-holding board 2 (FIGS. 6 and 7). The slide board 20 is provided with a guide hole 23 (FIG. 6), into which a guide pin 24 projectively provided on the upper surface of the cassette-holding board 2 is inserted. A guide pin 25 (FIG. 6) projectively mounted on the underside of the slide board 20 is inserted into a guide hole 26 formed in the cassette-holding board 2, enabling the slide board 20 to slide back and forth relative to the cassette-holding board 2. This slide board 20 is normally urged into the fixed case 1 by a tension spring 27 stretched between said slide board 20 and cassette-holding board 2. An abutting board 28 is fitted to the upper surface of the slide board 20 so as to slide back and forth relative to the cassette-holding board 2. This abutting board 28 has two guide holes 29, 30. A guide pin 31 projectively provided on the upper surface of the slide board 20 is inserted into one guide hole 29. The guide pin 24 is inserted into the other guide hole 30 aligned with the guide hole 23 of the slide board 20. Therefore, the abutting board 28 can slide back and forth relative to the slide board 20. A tension spring 32 having a greater force than the previously described tension spring 27 stretched between the slide board 20 and cassette-holding board 2 is provide between the slide board 20 and abutting board 28. Said tension spring 32 normally urges the abutting board 28 into the fixed case 1 relative to the slide board 20.

A shaft 33 supporting the pinch arm 22 is fitted with a bar spring 34 rotatable with the pinch arm 22. The forward end of the bar spring 34 is set between an engagement attachment 20a of the slide board 20 and an engagement attachment 28a of the abutting board 28.

A lock lever 35 is rotatably fitted to the guide pin 24. The lock lever 35 has a hook section 35a formed at one end. A lock pin 36 is provided in that portion of the fixed case 1 which faces said hook section 35a. The upper surface of the cassette holding-board 2 is fitted with engagement means 37 constituted by the lock lever 35, lock pin 36 and magnet 38. The lock lever 35 is urged counterclockwise by a spring 39. The opposite end of the lock lever 35 to that which is connected to the spring 39 is normally pressed against the magnet 38. When the cassette-holding board 2 slides into the fixed case 1 up to the position shown in FIG. 4, then the magnet 38 is supplied with power to attract the lock lever 35, and is rendered nonconducting at the stop mode. A concrete arrangement used in this connection is already known, description thereof being omitted. When the cassette-holding board 2 takes the position shown in FIG. 4, the hook section 35a of the lock lever 35 is engaged with the lock pin 36. While, therefore, the magnet 38 is supplied with power, the cassette-holding board 2 can not slide out of the fixed case 1. When power supply to the magnet 38 is cut at the stop mode, then the cassette-holding board 2 can be made to slide out of the fixed case 1 while the hook section 35a is released from the lock pin 36 with a slight force. While the cassette-holding board 2 remains in the position shown in FIG. 4, the bent portion of the abutting board 28 is pressed against the back wall 1c of the fixed case 1. As a result, the slide board 20 and abutting board 28 are jointly moved toward the cassette-loading section 9 against the urging force of the tension spring 27. Where, at this time, the tape cassette 8 is moved into the cassette-loading section 9, then the magnetic head 19 is brought into contact with a magnetic tape held in the cassette 8. The engagement attachment 28a of the abutting board 28 pushes the bar spring 34, causing the pinch arm 22 to be rotated clockwise. As a result, the pinch roller 21 is pressed against the capstan shaft 11 with a magnetic tape interposed between said pinch roller 21 and capstan shaft 11.

A tongue section 40 bent toward the longitudinal center line of the fixed case 1 is formed on the upper edge of the left side lateral wall 1a and right side lateral wall 1b of said case 1. The respective tongue sections 40 are each fitted with one end of a cassette-pressing plate spring 41. The other end of said plate spring 41 is bent inward of the fixed case 1 and is further slightly inclined downward.

Where it is desired to set the tape recorder for the play mode by loading the cassette 8 holding a recorded tape, it is advised first to let the cassette-holding board 2 slide out of the fixed case 1 as shown in FIG. 5, in order to load the tape cassette 8 in the cassette-loading section 9. At this time, the slide board 20 and abutting board 28 are pulled toward the fixed case 1 by the action of the tension spring 27. Therefore, the magnetic head 19 is set apart from the cassette-loading section 9. The engagement attachment 20a of the slide board 20 pushes the bar spring 34 into the fixed case 1. Therefore, the pinch roller 21 is held in a position removed from the cassette-loading section 9. The motor 14 is retained in the fixed case 1. The cassette-pressing plate spring 41 is disposed apart from the cassette-loading section 9.

When the cassette-holding board 2 is made to slide further into the fixed case 1, then the cam pin 15 mounted on the motor-fitting board 13 slides through the cam hole 16. The motor-fitting board 13 is rotated to bring the motor 14 near the cassette-loading section 9. The tape cassette 8 held in the cassette-loading section 9 is pressed downward from above by the paired cassette-pressing plate springs 41. When the cassette-holding board 2 reaches the position shown in FIG. 4, then the hook section 35a of the lock lever 35 is engaged with the lock pin 36. The magnet 38 is supplied with power, thereby causing the cassette-holding board 2 to be securely set in the position of FIG. 4. The magnetic head 19 is brought into contact with the tape received in the cassette 8. The pinch roller 21 is pressed against the capstan shaft 11 with the tape interposed between the pinch roller 21 and capstan shaft 11. The motor 14 is connected to a power source to rotate the capstan shaft 11 and the shaft 10a of a takeup reel. When the capstan shaft 11 is rotated, the magnetic tape travels for the play mode.

Where the operation of the cassette tape recorder is to be changed over from the play mode to the fast forward or rewind mode, then the slide board 20 is pushed into the fixed case 1. At this time, the magnetic head 19 is removed from the tape received in the cassette 8. The engagement attachment 20a of the slide board 20 pushes the bar spring 34, causing the pinch roller 21 to be released from the capstan shaft 11. Accordingly, the magnetic tape is quickly taken up on the takeup reel shaft 10a, or quickly rewound on the rewind reel shaft 10b.

At the stop mode, power supply to the motor 14 and magnet 38 is cut. The reel shafts 10a, 10b and capstan shaft 11 are brought to rest. As a result, the engagement means 37 ceases to lock the cassette-holding board 2.

Therefore, the cassette-holding board 2 is made to slide out of the fixed case 1 as shown in FIG. 5, thereby allowing for the ejection of the cassette 8 from the cassette-loading section 9.

According to the cassette tape recorder of this invention the cassette-holding board is made to slide, as described above, back and forth relative to the fixed case 1. As compared with the conventional cassette tape recorder, in which the reel shaft and capstan shaft are vertically moved, the cassette tape recorder embodying the invention has its thickness sufficiently reduced to be favorably used with a car stereophonic system.

What we claim is:

1. A cassette tape recorder comprising:

a fixed case;

a cassette holding board having a cassette loading section for detachably supporting a tape cassette;

at least one reel shaft mounted to said cassette holding board;

at least one capstan shaft mounted to said cassette holding board;

said cassette holding board being slidably mounted to said fixed case for movement in a direction perpendicular to the axes of said reel shaft and said capstan shaft between a first position wherein said holding board is drawn from said fixed case for supporting a cassette and a second position wherein said holding board is inserted in said fixed case;

a magnetic head and pinch roller movably mounted to said holding board for movement toward and away from said cassette loading section;

means for moving said magnetic head and pinch roller toward said cassette loading section when said holding board moves from said first position to said second position and away from said cassette loading position when said holding board moves from said second position to said first position; and a cassette-pressing plate spring mounted within said fixed case for fixing said tape cassette to said cassette loading section when said cassette loading board moves from said first position to said second position, with said tape cassette being supported on said cassette loading section.

2. The recorder as set forth in claim 1 and further including a motor, and means for movably mounting said motor to said cassette holding board for movement between a position adjacent said cassette loading section and a position remote from said cassette loading section.

3. The recorder as set forth in claim 2 and further including guide means extending between said motor mounting means and said fixed case for moving said motor between said position adjacent said cassette loading section and said position remote from said cassette loading section.

4. The recorder as set forth in claim 1 and further including locking means for locking said cassette holding board in said second position while a cassette is being played.

* * * * *